United States Patent [19]
Furlong

[11] Patent Number: 6,101,422
[45] Date of Patent: Aug. 8, 2000

[54] PROCESS CONTROL FOR VISCOUS MATERIALS

[75] Inventor: Christopher Furlong, Dublin, Ireland

[73] Assignee: Dawnlawn Limited, Dublin, Ireland

[21] Appl. No.: 09/001,562

[22] Filed: Dec. 31, 1997

[51] Int. Cl.⁷ ............................. G06F 19/00; G05D 11/16
[52] U.S. Cl. ........................... 700/96; 700/112; 700/115; 700/285
[58] Field of Search ................................ 700/95, 96, 112, 700/115, 275, 285

[56] References Cited

U.S. PATENT DOCUMENTS

| | | | |
|---|---|---|---|
| 5,311,438 | 5/1994 | Sellers et al. | 364/468 |
| 5,463,555 | 10/1995 | Ward et al. | 364/468 |
| 5,530,848 | 6/1996 | Gilbert et al. | 395/600 |

*Primary Examiner*—Joseph E. Palys
*Assistant Examiner*—Bethew B. Jennings
*Attorney, Agent, or Firm*—Jacobson, Price, Holman & Stern, PLLC

[57] ABSTRACT

A process controller has a processor with an activation controller, an transaction controller and a batch processor. The transaction controller operates in communication with a machine interface for controlling operations of a plant device for overall job sequencing and individual job control. There is automatic communication of various polling and return signals to ensure correct sequencing of mixing operations. The activation controller helps to ensure that the processor controller is configured at all times for correct operation at a particular materials distribution location. The activation controller 2(b) creates a control file and carries out verification operations automatically to ensure that the initially sorted data is correct. The batch processor operates with parallel control and transaction transmission files which are automatically transmitted to a host computer for consolidation. Control data in both the control and transaction transmission files ensure data integrity.

7 Claims, 3 Drawing Sheets

PROCESS CONTROL FOR VISCOUS MATERIALS

BACKGROUND OF THE INVENTION

1. Field of the Invention

The invention relates to process control and more particularly to a process controller for control of very viscous materials.

2. Description of the Prior Art

A variety of methods have been tried in the past to develop a process controller for such materials. Known solutions adequately address issues such as mixing and constituent ratios for example much work has been undertaken in relation to controlling the mixing in a rotatable mixing drum mounted. Similarly, much has been done to investigate systems for quantitatively regulating a viscous mixtures.

SUMMARY OF THE INVENTION

While highly automated machinery is available for the production of viscous materials which may be subject to hardening, such equipment is not generally interfaced directly with a process controller which is constructed for control of delivery of the materials in an integrated manner.

It is an object of the invention to provide a process controller which interfaces with viscous material production plant equipment for the timely and efficient delivery of very viscous materials and also for the delivery of associated materials to remote site.

Another object of the invention is that data which is generated by the process controller be consolidated together in an efficient manner with data integrity in a host computer system. A still further object is that waste both of time and materials is minimised at a manufacturing and delivery location.

Accordingly there is provided a process controller for viscous materials comprising a device interface, a printer interface, a non-volatile memory device, an access regulator and a user interface all operatively connected to and communicating with a processor, the processor in turn having three interoperable communicating components provided by an activation controller, a transaction controller and a batch processor, the activation controller having means for dynamically maintaining a control file with values for parameters associated with the viscous material manufacturing and distribution location, means for dynamically storing a table of geographical district codes, each associated with a range of distances between the distribution location and the district, means for directing storage of a set of transport type codes, each associated with a transport device, means for storing a list of material end use codes and means for automatically generating a job file for each material usage site to which materials are supplied by the distribution location, said job file including automatically retrieve pre-set codes, the transaction controller comprising means for retrieving a job file on receipt of delivery order data at the user interface, means for automatically generating plant device instructions according to data in the relevant job file, and data received from the user interface, means for automatically generating a command file using the machine instructions, means for transmitting the command file to the machine interface for transmission to the machine, means for retrieving operations data from the plant device via the machine interface and for retrieving a unique delivery docket number and directing printing via the printing interface of a unique delivery docket for the deliverable viscous material, means for writing a delivery record to a non-volatile memory device for each delivery docket printed, said record comprising data captured from print signals transmitted to the printer interface, the batch processor comprises means for retrieving the delivery records from the non-volatile memory device and for generating a transmission file which includes control data indicating aggregates for values of transactions within the delivery records, and the access regulator having means for validating the contents of and controlling access between the user interface and the control file, the table of geographical district codes, the stored set of transport type codes, the material end use codes, the job file the command file and the transmission file.

Preferably the access regulator incorporates a control generator connected to a timer device and the user interface for receiving a data access request from the user interface and generating a temporary two part authority register appropriate to the data access request, the regulator further incorporating means for retrieving and processing time and date information from the timer device in response to an updateable access function stored in the regulator to generate a sixteen bit validation word, a comparator communicating with the user interface for comparing the validation word and a preset portion of the data access request, a generator for appending bytes to the two part authority register in response to a matched output from the comparator to identify a read only authority byte and an update authority byte and means for updating an access log with the validation word regulator incorporates a bit encoder for selectively encrypting and storing selected files using the validation word.

Preferably the activation controller comprises means for automatically verifying distance data inputted for a delivery of viscous material by reference to the reference distance ranges associated with the retrieved district code.

In one arrangement the transaction controller comprises means for initially repeatedly polling the plant device for presence of a flag to indicate that the command file may be transmitted, means for transmitting a preliminary command when said flag is detected, means for monitoring the machine interface for receipt of a return signal, and means for transmitting the command file on detection of such a return signal.

Preferably the transaction controller comprises a means for retrieving concrete mixing data by repeatedly polling the non-volatile memory of the plant device for the presence of real-time operations data.

Preferably the transaction controller comprises a means for inserting an indicator indicating transmission status of each delivery record as it is being written to the non-volatile memory device.

Preferably the batch processor comprises means for automatically generating a header for the transmission file including data relating to the distribution location, and a trailer for the transmission file including the control data.

Ideally the batch processor comprises means for transmitting the control data as a separate file in association with the transmission file for verification by the host computer.

DESCRIPTION OF THE PREFERRED EMBODIMENTS

The invention will be more clearly understood from the following description of some embodiments thereof, given by way of example only with reference to the accompanying drawings, in which.

Figure 1:
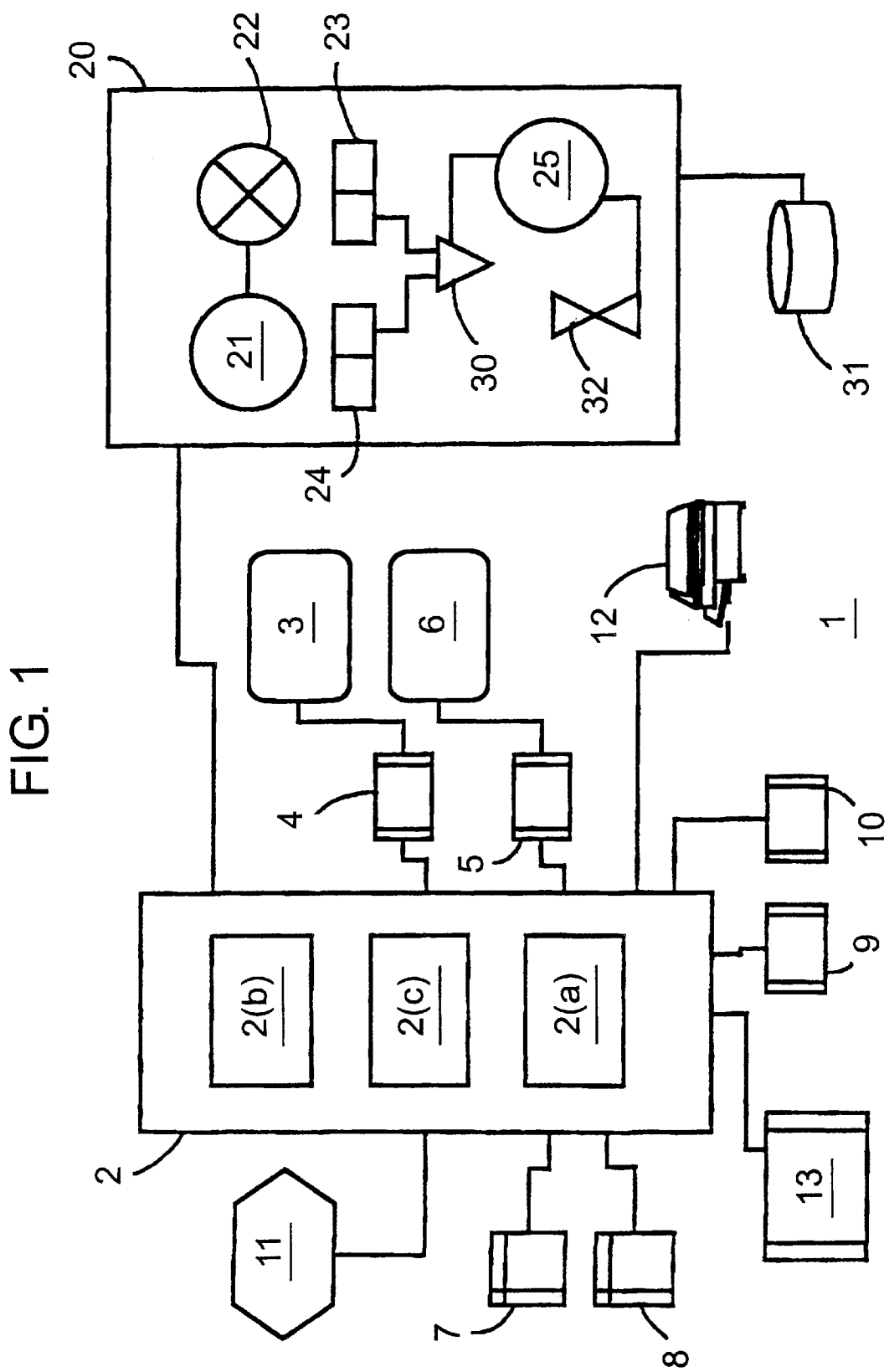
FIG. 1 is a block diagram showing construction of a process controller of the invention.

Referring initially to FIG. 1, there is shown a process controller of the invention indicated generally by the reference numeral 1 for controlling very viscous materials. The process controller 1 comprises a local storage device and interface processor 2 which is connected indirectly to a plant device 3 for processing the material. The device 3 is of the type for automatic mixing of the various constituents according to electronically stored instructions and for output either to a screen or to a printer of material mixing operations data in real-time.

The process controller 1 is constructed for interfacing with the device 3 and also for interfacing with users and with other devices such as card readers for the control of viscous material handling operations at a particular location. Indeed, the process controller 1 may be referred to as a "location system" controlling the operation of plant equipment, through distribution to a wide variety of usage sites and complete order processing. The controller 1 is also constructed for communication with a host data processor for overall monitoring and central data processing. The process controller 1 further comprises an access regulator 20 for validating the contents of and controlling access between the user interface 11 and the control file 9.

The access regulator 20 also incorporates a control generator 21 and an associated timer device 22 for receiving a data access request from the user interface 11 and generating a temporary two part authority register 23 appropriate to the data access request. The access regulator 20 incorporates means for retrieving and processing time and date information from the timer device 22 using an internal processor (not shown). This internal processor and an internal updateable access function of the regulator 20 are used to generate a sixteen bit validation word 24.

The regulator 20 has a comparator 30 communicating with the user interface 11 for comparing the validation word 24 and a preset portion of the data access request from the user interface 11. The regulator 20 also has a generator 25 for appending bytes to the two part authority register 23 in response to a matched output from the comparator 30 to identify, a read only authority byte and an update authority byte, and means for updating an access log 31 with the validation word 24. The access regulator 20 further incorporates a bit encoder 32 for selectively encrypting and storing selected files using the validation word 24.

The processor 2 comprises an transaction controller 2(a), an activation controller 2(b), and a batch processor 2(c). These sections of the processor 2 may take the form of separate microprocessor circuits linked together in a networked arrangement, or alternatively a powerful microprocessor circuit programmed for carrying out operations so that it may be configured at any particular time to operate in any one of the three ways. The processor 2 is connected to the device 3 via a machine interface 4 which connects with the machine 3 by an RS232 interface. A printer interface 5 is connected to the processor 2 for control of a printer 6. Operations of the printer 6 are very important in material handling, particularly in relation to delivery dockets. Random Access Memory (RAM) and Read Only Memory (ROM) circuits 7 and 8 are connected to the processor 2. Further, there is a control file 9 and a set of job files 10 connected to the processor 2. The processor controller 1 further comprises a keyboard user interface 11, a magnetic card reader 12 and a modem 13 connected to the processor 2. The modem 13 is for communication with the remote host processor.

The manner in which the activation controller 2(b) operates is very important to overall operation of the process controller 1. The activation controller 2(b) is constructed to initially generate and to dynamically maintain the control file 9. The control file 9 is a set of control parameters which control the manner in which the material deliveries are performed for that particular location job. Parameters set by the control file 9 include a weighing method indicator, material loss allowance percentage value and a time period for automatic deletion of data from the live databases. Indeed, the control file includes values or sets of possible values for what would appear to be trivial, but are very important matters such as the manner of quantifying the viscous material quantity. An important aspect of operation of the process controller is that it can refer to the control file 9 for a setting of such simple parameter values so that there is consistency in operation of the controller 1 for the particular location.

The activation controller 2(b) also directs storage and dynamic maintenance of a table of geographical districts and ranges for distances between the location where the material is produced and final usage sites within each district. It also directs storage of codes for a pre-set group of transport vehicle types and end use types. The end use type indicating the final application for which the material is intended.

The activation controller 2(b) monitors the user interface 11 for reception of data relating to a new job which is defined by the controller 2(b) as a new site which will be supplied by the location with viscous material. On detection of such data, the controller 2(b) automatically retrieves relevant district, transport and end use codes according to the received data and creates a job file to which these codes are written. Other data received from the user interface 11 is written to the job file and some of this data is subject to automatic verification operations. Such operations include verification of the distance between the site and the location by automatic reference to the ranges associated with the district code. Another verification operation is verification of the ability of the transport device associated with the transport code to handle the allocated material and to carry the load which is requested initially.

On detection of this data it is passed to the access regulator 20 which issues an asynchronous activate signal to the control generator 21. When the control generator 21 receives this activate signal it immediately polls the timer device 22. The timer device 22 returns a chronometric value for current time and date and passes the values to the internal processor. The internal processor in turn uses the updateable access function of the regulator 20 to generate the sixteen bit validation word 24. It will be appreciated that the access function may manipulate the returned value prior to the generation of the validation word 24 in any of a number of ways whether based on a mathematical or logical algorithm. This ensures that even in the event of an unauthorised user noting acceptance details of an access request by an authorised user the useful the period during which the details will operate is extremely limited. Similarly as the access function of the regulator 20 is updateable periodically it prevents the unauthorised users from interpolating the operation of the function using a number of noted acceptances.

The access regulator 20 then generates the temporary two part authority register 23 by reading and storing two selected eight bit words of the data access request. This authority register 23 is passed with the validation word 24 to the comparator 30 before initialising two eight bit comparisons of the contents. When a matched output of either of the word comparisons is received the regulator 20 passes the matched portion to the generator 25 to appended the matched bytes to the two part authority register 23. When a first byte is appended to the register 23 coupled with a second null byte this identifies a read only authorisation however when two non-null bytes are appended an update authority is indicated. The access log 31 is then updated with the validation word 24 to log all data requests received from the user interface. In this way it will be immediately apparent on review of the log 31 if a number of authorisation failures indicating tampering with the system have occurred.

Figure 2:
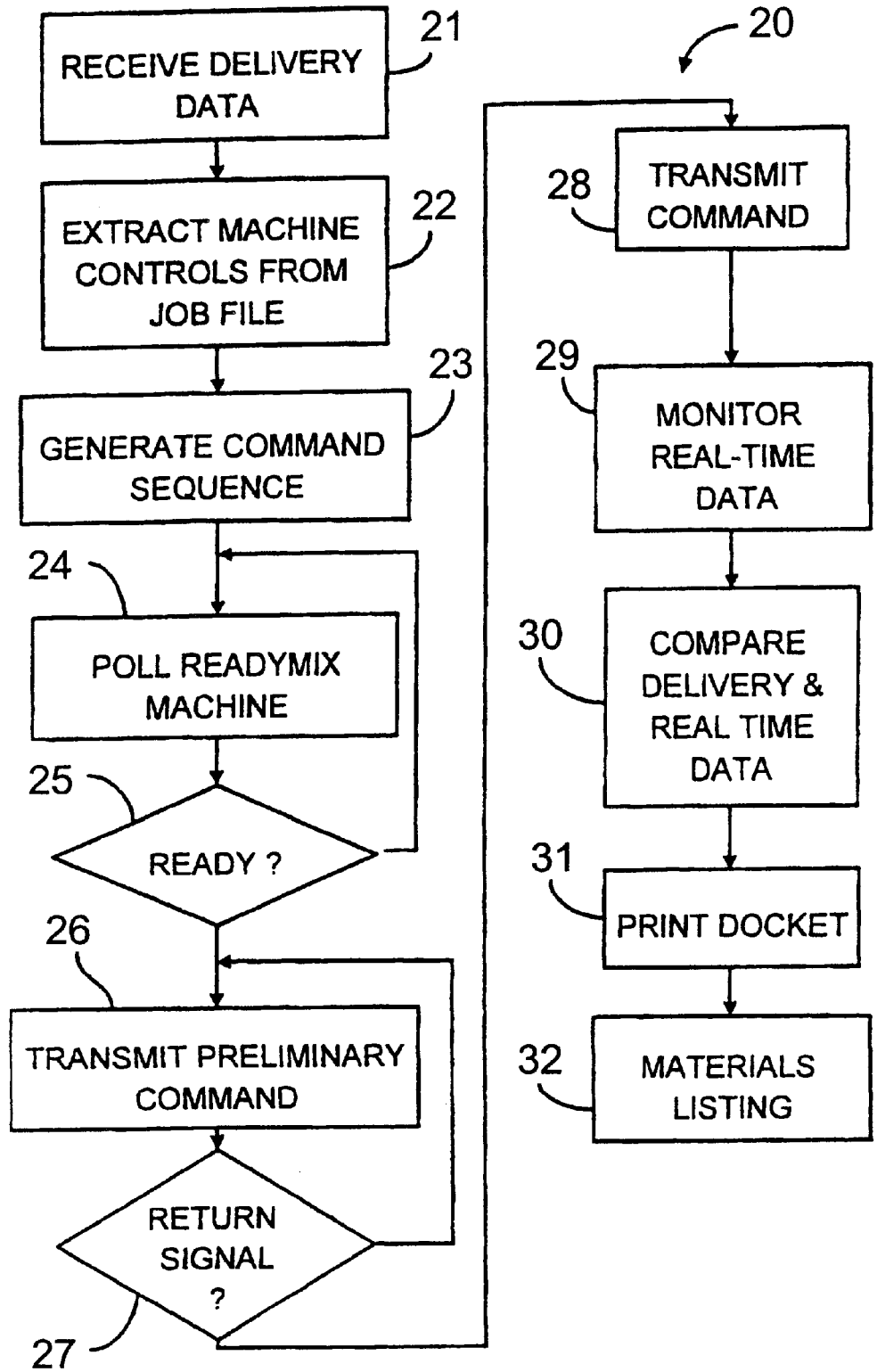
FIG. 2 is a flow chart showing operation of an transaction controller within the process controller.

Referring to FIG. 2, when data relating to a particular delivery order is inputted in step 21 at the interface 11, the transaction controller 2(a) automatically detects this and retrieves the relevant job file. As stated previously, there is a job file for each material usage site and in general there would be numerous different deliveries over a period of time to the site. The card reader 12 is used for reading of a transport operator code. Interactively received delivery data and data retrieved from the job file in step 22 are used in generating a command file in step 23 comprising machine control constructions. This command file is in ASCII format and is stored in the RAM 7. The transaction controller 2(a) is constructed to repeatedly poll the device 3 for a flag to indicate that it can transmit the command file. The flag takes the form of a status register in the plant machine interface 4. This step is indicated by the step 24 of FIG. 2 and if the flag is present, a preliminary command is transmitted in step 26.

The transaction controller 2(a) monitors the machine interface 4 for presence of a return signal from the device 3. A preliminary command is transmitted every three seconds while a return signal is awaited. When the return signal is received in step 28, the transaction controller 2(a) transmits the full command file which is received by the device 3 from the interface 4 and written to a non-volatile memory. The device 3 has its own controller which sequences the jobs according to priority data embedded in the command files and it records in the non-volatile memory real-time operations data as material is being mixed. The transaction controller 2(a) accesses the non-volatile memory via the machine interface 4 to monitor it for presence of the real-time operations data as indicated by the step 29.

In step 30, the controller 2(a) automatically compares the delivery data which is embodied in the command file and the real-time data which is being generated and in step 31 it prints a delivery docket if the comparison is correct. The docket which is printed has a unique code which is pre-set in the fixed disks of the process controller 1 and verification operations are carried out to ensure that a docket number is not used a second time in step 32. There is a set of manual over-ride docket numbers which may be used in the event of breakdown of the processor controller 1. In general, the transaction controller 2(a) monitors the sequence of operations of the device 3 for overall control purposes. It has been found that by interfacing with the device 3 in this manner, optimum control is achieved whereby operations of the device are not interfered with unless absolutely necessary. At the same time, urgent delivery orders may be dealt with efficiently and the quality of the deliveries may be monitored closely.

The transaction controller 2(a) is also constructed to handle deliveries of other goods by communication with the user interface 11 which receives indications of the quantities and types of goods. The process controller 1 is thus extremely versatile and is used for a delivery of different materials, while being particularly suitable for handling viscous material.

Figure 3:
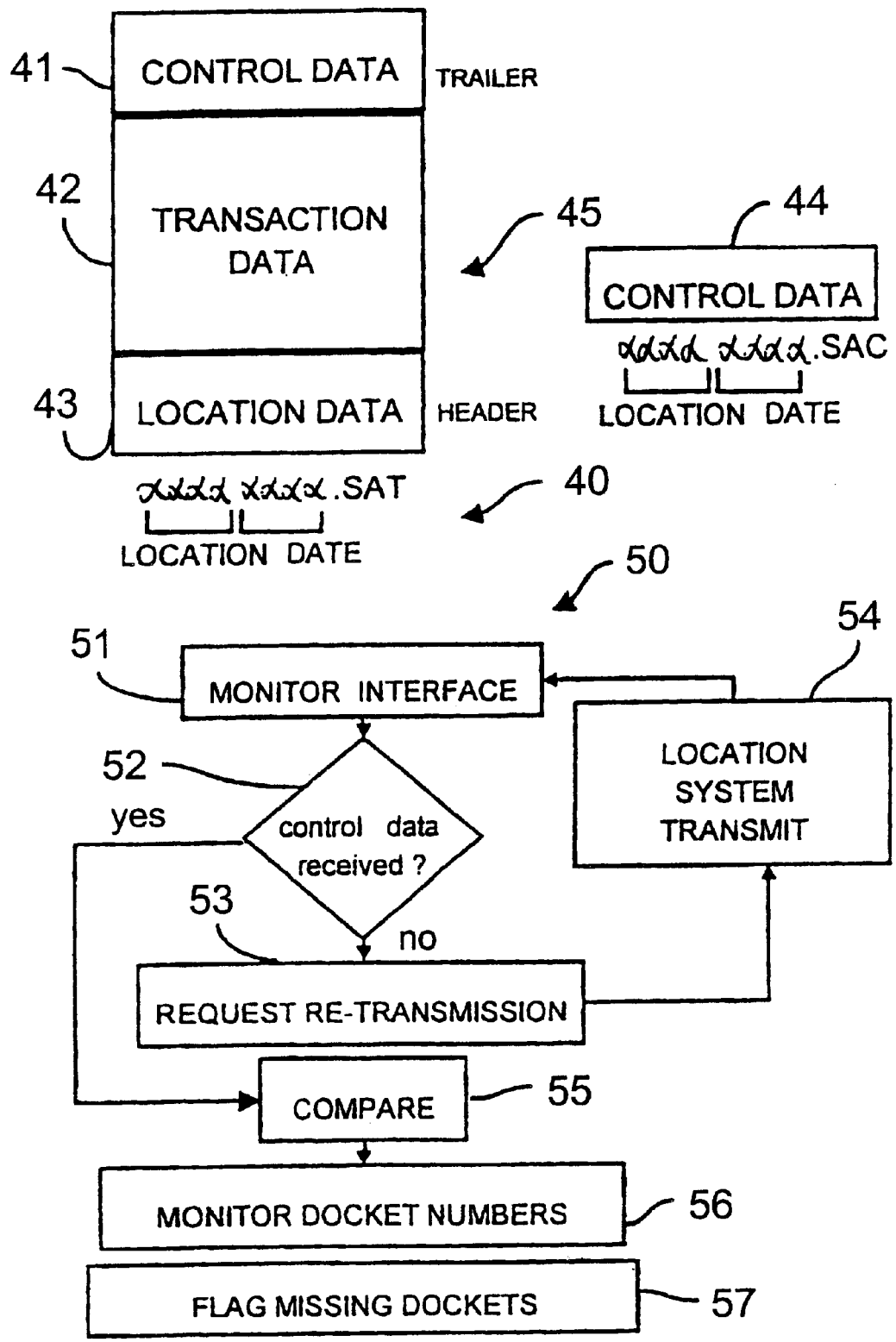
FIG. 3 is a diagram showing operations of a batch processor within the process controller.

An important aspect of operation of the transaction controller 2(a) is that it writes a record for each delivery docket to disk and sets a flag in the record to indicate whether or not it has been transmitted to the host computer via the modem 13. For various reasons, a delivery record may remain on the process controller 1 without being transmitted for a period of days, depending on the nature of the deliveries involved. However, the control file 9 sets a maximum number of days for holding the data without transmission to the host computer. Upon expiration of this period, the batch processor 2(c) automatically transmits the record. However, in the vast majority of cases, the delivery records are automatically transmitted in an end-of-day process carried out by the batch processor 2(c). The batch processor 2(c) filters the delivery records according to their flags and generates a transmission file storing the records. In addition, the various other transaction data such as material purchasing data is written to the transmission file according to the various general programs. The batch processor 2(c) automatically generates a unique name for the transmission file and this is indicated by the numeral 40 in FIG. 3. The name takes the form ααααααα.SAT, where α indicates an alpha-numeric character. The first four characters are a code for the location and the fifth to eight characters indicate the date. The extension "SAT" of the transmission file 40 indicates that it is a transaction file. The batch processor 2(c) also automatically creates a header 43 for the transmission file 40, which header includes location data. The various transaction records are written to a transaction data section 42 of the file 40, and finally there is a trailer 41 which includes control data. This control data indicates the number of delivery docket records included in the file 40, an aggregate quantity for each type of viscous material delivered, an aggregate financial value on the sales and various other aggregate data relating to the transactions. In addition, the batch processor 2(c) automatically generates a control transmission file 44 which is a replica of the trailer 41 of the transmission file 40. However, the control transmission file 44 is automatically assigned a name which has the same prefix as the transmission file 40, but different extension, "SAC".

The batch processor 2(c) automatically transmits both the control transmission file 44 and the transmission file 40 via the modem 13 to the host computer. The host computer operates according to the flow chart in FIG. 3 indicated by the reference numeral 50 and in step 51 monitors its input interface for reception of these files. In particular, in step 53 the host computer requests re-transmission of both files if the control file 44 is not received as indicated by the decision step 52. In this case, the process controller 1 automatically re-transmits both files 40 and 44 as indicated by the step 54.

When both the files 40 and 44 are safely received, the host computer in step 55 automatically compares the data in the file 44 and in the trailer 41. If this data is exactly the same, it then automatically processes the transaction data 42 and compares the aggregate values as determined with that in the control data of the trailer 41. An important aspect of operation of the host computer is that it monitors the docket numbers in step 56 and in step 57 it flags the pre-recorded list of docket numbers to indicate those which have been used. There are very strong access control procedures for access to the pre-recorded list to ensure that there is good data integrity and materials control.

It will be appreciated that by operation of the three sections of the processor 2, comprehensive control of a viscous materials distribution location is achieved, while at the same time the facilities provided for consolidation of data at a central location. An important advantage of the invention is the fact that the process controller 1 may be used in many different material delivery locations by setting of different values on the control file, and without the necessity to modify the sections of the processor 2. Interfacing with the device 3 is extremely reliable and simple to ensure that individual material mixes are correct and also that overall sequencing is in order.

In some situations the controller may be configured so that the communications processor activates the bit encoder 32 as each record is stored for selectively encrypting and storing the record using the validation word 24 in a control file. This control file is processed on receipt by the host to ensure the accuracy and completeness of the transaction data and in the event of a comparison fail will cause the communication processor to automatically retransmit the files. In the unlikely event of a second failure to validate the data a copy of the transmission file secretly stored on the controller 1 is requested by the host which is transmitted by the communications processor. A bit comparison of the two files is conducted by the host to identify anomalies. in this way a secure process controller is guaranteed which overcomes the problems associated with fraudulent interference by users.

The invention is not limited to the embodiments hereinbefore described, but may be varied in construction and detail.

What is claimed is:

1. A process controller for viscous materials comprising a device interface, a printer interface, a non-volatile memory device, an access regulator incorporating a control generator connected to a timer device and a user interface for receiving a data access request from the user interface and generating a temporary two part authority register appropriate to the data access request all operatively connected to and communicating with a processor, the processor in turn having three interoperable communicating components provided by an activation controller, a transaction controller and a batch processor, the activation controller having means for dynamically maintaining a control file with values for parameters associated with the viscous material manufacturing and distribution location, means for dynamically storing a table of geographical district codes, each associated with a range of distances between the distribution location and the district, means for directing storage of a set of transport type codes, each associated with a transport device, means for storing a list of material end use codes and means for automatically generating a job file for each material usage site to which materials are supplied by the distribution location, said job file including automatically retrieve pre-set codes, the transaction controller comprising means for retrieving a job file on receipt of delivery order data at the user interface, means for automatically generating plant device instructions according to data in the relevant job file, and data received from the user interface, means for automatically generating a command file using the plant device instructions, means for transmitting the command file to the machine interface for transmission to the machine, means for retrieving operations data from the plant device via the machine interface and for retrieving a unique delivery docket number and directing printing via the printing interface of a unique delivery docket for the deliverable viscous material, means for writing a delivery record to a non-volatile memory device for each delivery docket printed, said record comprising data captured from print signals transmitted to the printer interface, the batch processor comprises means for retrieving the delivery records from the non-volatile memory device and for generating a transmission file which includes control data indicating aggregates for values of transactions within the delivery records, and the access regulator having means for validating the contents of and controlling access between the user interface and the control file, the table of geographical district codes, the stored set of transport type codes, the material end use codes, the job file, the command file and the transmission file and having means for retrieving and processing time and date information from the timer device in response to an updateable access function stored in the regulator to generate a sixteen bit validation word, a comparator communicating with the user interface for comparing the validation word and a preset portion of the data access request, a generator for appending bytes to the two part authority register in response to a matched output from the comparator to identify a read only authority byte and an update authority byte and means for updating an access log with the validation word, the regulator further incorporating a bit encoder for selectively encrypting and storing selected files using the validation word.

2. A process controller as claimed in claim 1, wherein the activation controller comprises means for automatically verifying distance data inputted for a delivery of viscous material by reference to the reference distance ranges associated with the retrieved district code.

3. A process controller as claimed in claim 1 wherein the transaction controller comprises means for initially repeatedly polling the plant device for presence of a flag to indicate that the command file may be transmitted, means for transmitting a preliminary command when said flag is detected, means for monitoring the machine interface for receipt of a return signal, and means for transmitting the command file on detection of such a return signal.

4. A process controller as claimed in claim 1 wherein the transaction controller comprises a means for retrieving concrete mixing data by repeatedly polling the non-volatile memory of the plant device for the presence of real-time operations data.

5. A process controller as claimed in claim 1 wherein the transaction controller comprises a means for inserting an indicator indicating transmission status of each delivery record as it is being written to the non-volatile memory device.

6. A process controller as claimed in claim 1 wherein the batch processor comprises means for automatically generating a header for the transmission file including data relating to the distribution location, and a trailer for the transmission file including the control data.

7. A process controller as claimed in claim 6 wherein the batch processor comprises means for transmitting the control data as a separate file in association with the transmission file for verification by the host computer.

* * * * *